US008635658B2

(12) United States Patent
Patten et al.

(10) Patent No.: US 8,635,658 B2
(45) Date of Patent: Jan. 21, 2014

(54) BROADCAST SOCIAL AND MEDIA NAVIGATION SYSTEM

(75) Inventors: Michael J. Patten, Sammamish, WA (US); James T. Walter, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 835 days.

(21) Appl. No.: 12/463,518

(22) Filed: May 11, 2009

(65) Prior Publication Data

US 2010/0287592 A1 Nov. 11, 2010

(51) Int. Cl.
*H04N 7/16* (2011.01)
*G06F 3/00* (2006.01)
*H04H 60/32* (2008.01)

(52) U.S. Cl.
USPC ............................... 725/115; 725/53; 725/14

(58) Field of Classification Search
None
See application file for complete search history.

(56) References Cited

U.S. PATENT DOCUMENTS

| 6,154,205 | A | 11/2000 | Carroll et al. | |
|---|---|---|---|---|
| 6,751,776 | B1 | 6/2004 | Gong | |
| 6,990,676 | B1 | 1/2006 | Proehl et al. | |
| 2006/0085826 | A1* | 4/2006 | Funk et al. | 725/87 |
| 2006/0107304 | A1 | 5/2006 | Cleron et al. | |
| 2007/0214477 | A1 | 9/2007 | Read | |
| 2007/0234214 | A1 | 10/2007 | Lovejoy et al. | |
| 2008/0098433 | A1 | 4/2008 | Hardacker et al. | |
| 2008/0104127 | A1 | 5/2008 | Billmaier et al. | |
| 2008/0162660 | A1* | 7/2008 | Becker | 709/213 |
| 2009/0158346 | A1* | 6/2009 | Zer et al. | 725/47 |
| 2009/0249409 | A1* | 10/2009 | Bhogal et al. | 725/86 |
| 2010/0146077 | A1* | 6/2010 | Davies et al. | 709/219 |

FOREIGN PATENT DOCUMENTS

EP 1758383 A3 2/2007

OTHER PUBLICATIONS

Navigation—Navigation Strip, website, http://fcweb.sd36.bc.ca/~197084/FAV1-000B965E/S0283AF66-0283AF6D.
Frank Shipman, Creating Navigable Multi-Level Video Summaries, Proceedings of the 2003 International Conference on Multimedia and Expo, 2003, pp. 753-756, IEEE Computer Society Washington, DC, USA.
Payam Mamaani Barnaghi, Automatic Hypermedia Presentation Generation System, thesis paper, Apr. 2007, http://dspace.fsktm.um.edu.my/xmlui/bitstream/handle/1812/59/Payam.Barnaghi-Thesis.pdf?sequence=1.

* cited by examiner

*Primary Examiner* — Brian T Pendleton
*Assistant Examiner* — Jean D Saint Cyr
(74) *Attorney, Agent, or Firm* — Vierra Magen Marcus LLP (57) ABSTRACT

Methods for providing access to third-party content related to a television program of interest to a user via a single user interface. When a user schedules a recording of a television program, the metadata associated with the television program is obtained. At least one broadcast network content provider and at least one non-broadcast network content provider are queried for content relevant to the metadata. Content received from the at least one broadcast network content provider and the at least one non-broadcast network content provider is aggregated by type of media and stored. A navigation strip is rendered providing access to the recorded television program and the content received from the at least one broadcast network content provider and the at least one non-broadcast network content provider.

16 Claims, 11 Drawing Sheets

BROADCAST SOCIAL AND MEDIA NAVIGATION SYSTEM

BACKGROUND

Many popular television series have a devoted fan base. These devoted viewers establish websites and blogs dedicated to the television series to share their viewing experiences, review episodes, discuss what will happen next to certain characters in the series, advertise upcoming fan parties, post comments about the series/episode via social networking sites, and the like. The broadcast television network that provides the popular television series also creates and maintains at least one website dedicated to the television series. The network's website often provides "behind-the-scene" videos, photographs of the cast, exclusive interviews with the cast, trailers, and offers merchandise related to the series.

There is no single website or third-party service that provides all of the latest information regarding the television series. Keeping up with the latest information about the television series often requires a user to navigate between numerous third-party websites as well as the network's website. Thus, it is difficult and tedious for a user to keep up with the latest information about their favorite television series.

SUMMARY

One aspect of the present technology is to provide a service that collects and aggregates third-party content related to a television series of interest to a user. The technology detects that a user has requested to record a television episode (or series), and obtains metadata associated with the television episode. Using the metadata associated with the television episode, the technology queries registered content providers for content within their control that is related to the television episode and series. Content is returned from each registered content provider (e.g., photos, videos, prior episodes, etc.). The content received from the registered content providers is aggregated together into groups of related content based on metadata associated with each instance of content and stored.

One aspect of the present technology is to present the content received from the content providers to a user via a navigation strip. In some embodiments, a navigation strip is rendered upon detecting that the user has selected to view a recorded television episode. In another embodiment, the navigation strip is rendered upon the user selecting to pause the viewing of a television episode during playback of the episode.

A navigation strip provides a framework for displaying a television episode and third-party content related to the television episode (and series if the episode is associated with a series) in a single user interface. The third-party content displayed in the navigation strip may include comments made by friends, previous episodes, videos/photos, surveys/trivia, blogs, ratings, reviews, merchandise, and the like. Upon a user selecting a content group displayed in the navigation strip, the third-party content associated with the group is displayed in the navigation strip for selection by the user. From a user's perspective, the navigation strip provides the opportunity to easily view and navigate all available third-party content related to a television episode/series via a single user interface.

DETAILED DESCRIPTION

The technology described herein collects and organizes third-party content related to a television program and renders a navigation strip that provides access to the third-party content. The technology queries content providers for content within their control that is related to a television program (or series) a user has requested to record. The content received from each content provider is aggregated into groups and stored. The navigation strip allows a user to view and navigate through the third-party content (e.g., prior episodes, friend's comments, images, etc.) via a single user interface.

Figure 1:
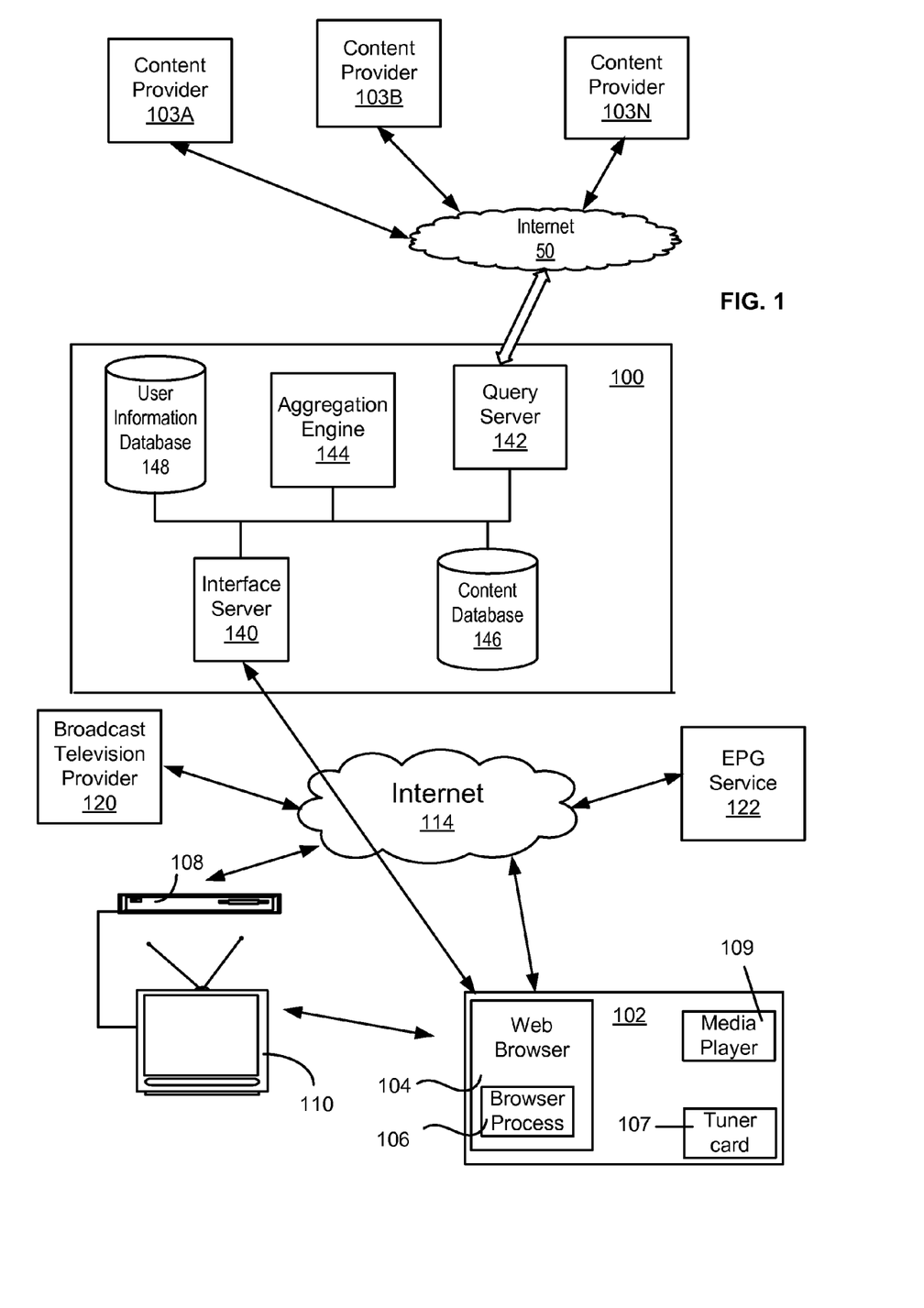
FIG. 1 depicts an exemplary system according to the present technology.

The technology disclosed herein will now be described with reference to FIGS. 1-11. FIG. 1 illustrates an exemplary system 100 for rendering a navigation strip. The system 100 may include an interface server 140, which provides a browser based user interface access to content database 146 via the Internet 114 to a client's operating computer 102 utilizing a web browser 104 and a browser process 106. The system 100 is not limited to a browser based user interface. It is within the scope of the technology described herein for the system 100 to operate in connection with other devices that generate and display an EPG such as, but not limited to, a set-top box, game console, mobile phone, smart phone, and the like. A set-top box may be configured to accept a signal source from, by way of example only, an Ethernet cable, a satellite dish, a coaxial cable, a telephone line (including DSL connections), Broadband over Power Line, or even an ordinary VHF or UHF antenna.

The system 100 may also include a query server 142, which forwards queries to and accepts content from content providers 103 via the Internet 50, and forwards the content to the content database 146. The term "registered content provider" used herein refers to any third-party website or service that supplies online information and has registered with the system 100. Requiring content providers 103 to register with the system 100 essentially forms a pool of available content providers that may be queried by the query server 142 to obtain relevant content for a navigation strip. FIG. 1 illustrates that any number of content providers 103A . . . 103N may be queried by system 100. Content received from the content providers is stored in content database 146.

The system 100 may also include an aggregation engine 144 and user information database 148. The aggregation engine 144 aggregates like media content received from the registered content providers 103. The user information database 148 stores user profile information related to the user. In some embodiments, a user may add their account information (e.g., username, email address, content access level, etc.) for one or more third-party content providers to their profile page (not shown) using the web browser 104. On example of such a profile page is profile.live.com. It is within the scope of the technology to store and organize profile information by other means. The user's account information for each content provider is stored in the user information database 148.

FIG. 1 illustrates that a user may view broadcast television programs provided by a broadcast television provider 120 via the computer 102 having a tuner card 107. The user may view an electronic program guide (EPG) provided by an EPG service 122 via a media player 109. Alternatively, the user may view broadcast television programs provided by a broadcast television provider 120 via a television 110. In this instance, the user may view an electronic program guide (EPG) provided by an EPG service 122 via a set-top box 108. The EPG service 122 and broadcast television provider 120 provided via the Internet 114 are exemplary only. Broadcast television channels, as well as the EPG, may be provided through other means such as, but not limited to, a satellite service, a cable service, IPTV, and the like.

A user, via either the computer 102 or the television 110, may schedule a recording of a specific television episode of a television series, schedule to record every episode of a series, or schedule to record a one-off event (e.g., sports event, movie, etc.) using an EPG. Any method known today for scheduling recordings of television programs is within the scope of the technology described herein. The recorded episode is stored for later viewing by the user. In some embodiments, the episode is stored on the user's computer 102 for later viewing. In other embodiments, the episode is stored on the set-top box 108 for later viewing by the user. Either way, the user may view the recorded episode at his leisure by accessing a recorded programs menu (not shown) via the media player 109 or the set-top box 108 and selecting to play the episode. Media players, as well as set-top boxes, provide media controls so that a user may play, pause, fast-forward or rewind through the episode.

Figure 2:
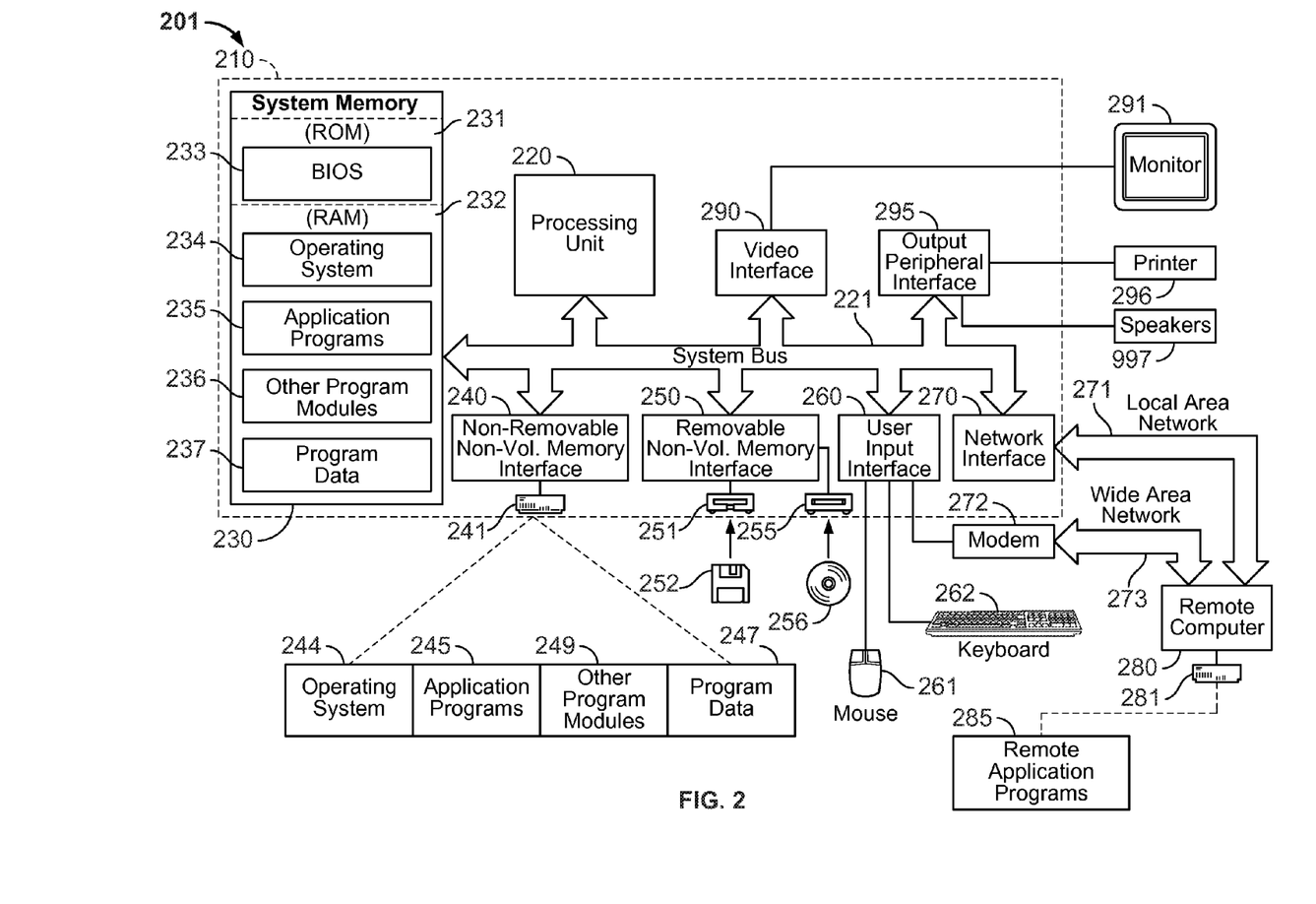
FIG. 2 depicts a schematic diagram of a computer for performing each of the methods described herein.

With reference to FIG. 2, an exemplary system for implementing the technology described herein includes a general purpose computing device in the form of a computer 210. Components of computer 210 may include, but are not limited to, a processing unit 220 (which can include multiple processors), a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data. By way of example, and not limitation, communication media includes wired media such as a wired network or direct-wired connection, and wireless media such as RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 240 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 146, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through a output peripheral interface 290.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 171 through a network interface or adapter 270. When used in a WAN networking environment, the computer 210 typically includes a modem 272, network interface or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Figure 3:
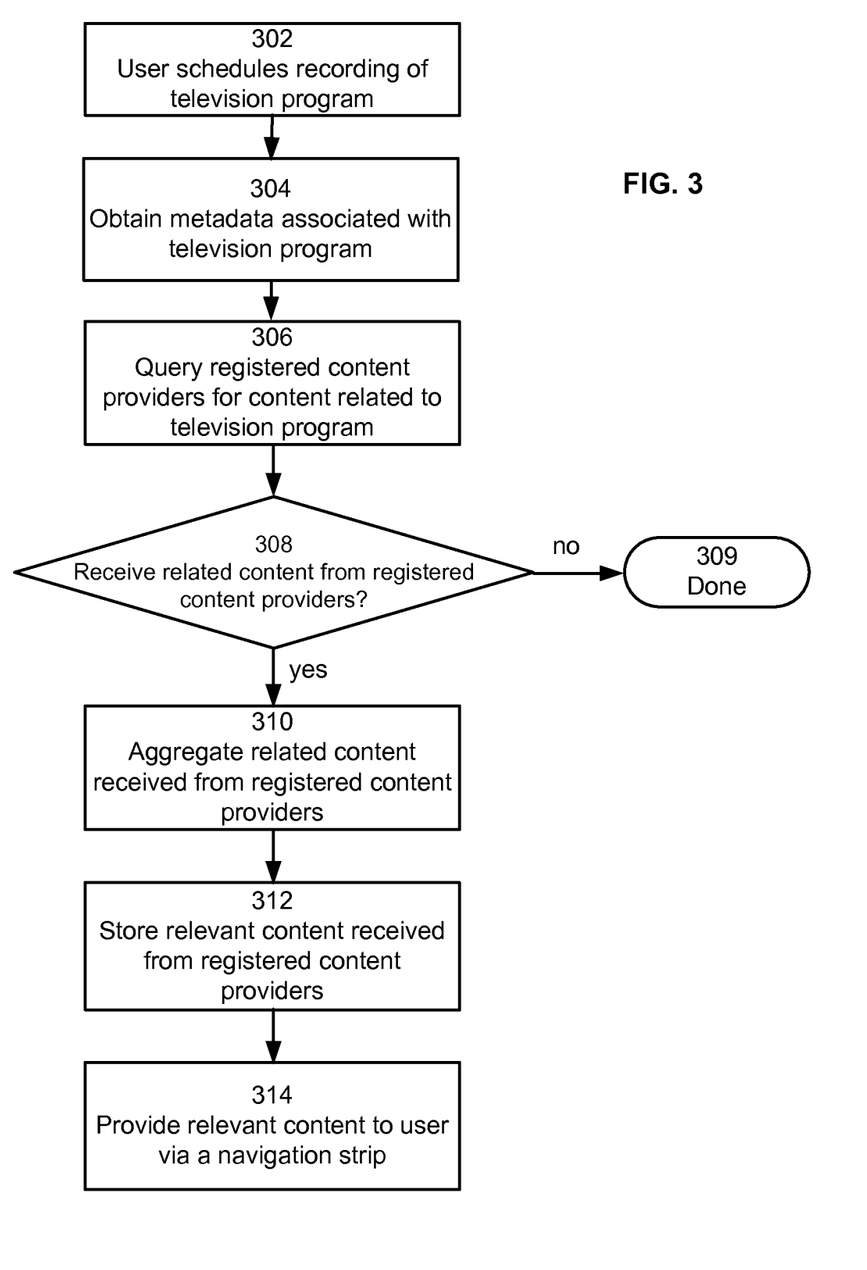
FIG. 3 depicts a flow diagram illustrating exemplary steps for providing third-party content to a user.

FIG. 3 illustrates exemplary steps for rendering a navigation strip. At step 302, a user schedules the recording of a television program. The term television program may be used herein to refer to an episode, a series or a one-off broadcast. Using the example provided in FIG. 1, the user may schedule a recording of a television episode (or series) either via the media player 109 (via the computer 102) or via the set-top box 108 (via the television 110). It is also within the scope of the technology to schedule a recording via other devices such as, but not limited to, a mobile phone, a personal digital assistance (PDA), a smart phone, and the like.

At step 304, the system 100 obtains the metadata associated with the television episode that the user has requested to record. There are various standards used today for labeling audiovisual content, which includes television programming, with metadata. The Moving Pictures Experts Group (MPEG) has developed the MPEG-7 standard, which provides for labeling television programming content with metadata. The TV Anytime Forum (TVAF) provides another standard for labeling audiovisual content with metadata. The MPEG-7 standard and the TVAF standard are exemplary only, and are not intended to limit the scope of the technology described herein.

In general, television programming content is labeled with "content" metadata and "instance" metadata. Content metadata includes, among other things, the content title, content description, television station call letters (of the network that originally aired the episode as well as the current network), and genre associated with the content. Instance metadata includes, among other things, usage rules and delivery parameters. Content metadata and instance metadata are created by the content provider. Television programming content is labeled with metadata provided by the broadcast television network. Metadata may be physically located with the audiovisual material, in the same data stream or on the same storage system. Metadata may also be located elsewhere, in which case a link to the metadata is provided with the content. In some embodiments, the metadata obtained at step 304 is limited to content metadata. In other embodiments, the metadata obtained at step 304 includes both content metadata and instance metadata.

At step 306, the query server 142 queries each of the content providers 103 for content that is related to the television episode. In some embodiments, if the television episode is part of a television series, the query server 142 queries each content provider 103 for any content related to the series as well as the specific episode. In other embodiments, the query includes all of the metadata obtained at step 304. Alternatively, the query contains only the content metadata associated with the television episode. A query may specify a date range for the relevant content (e.g., last 7 days, last 30 days, etc.). However, it is within the scope of the technology described herein for a query to request all content that is related to a television episode (or series).

The date range in a query may vary depending on the subject matter of the television episode itself. For example, if the recorded television episode is an episode of a weekly series, the query may request content from each provider 103 that has been added to the provider's site since the last episode to obtain the most recent information. Alternatively, the date range in a query may vary depending on whether new episodes of a television series are being broadcast (indicating whether the series is in-season or off-season). While a series in in-season, it is likely that more third-party content is being generated than during off-season. Thus, a query sent to content providers 103 during off-season may have a longer date range. IN yet another example, if the recorded episode is a one-off broadcast, it is likely that third-party content is not regularly available, and the date range in the query may specify content within the last few months. These date ranges are exemplary only, and are not intended to limit the scope of the technology described herein.

A query allows the system 100 to specify a description of the television episode (using the metadata) program and the date range that content should be within to be considered "relevant." However, it is left to the devices of the content provider 103 to plan, optimize, and perform the physical operations necessary to produce that result set in as efficient a manner as possible. The system 100 relies on each content provider 103 to return only content that is relevant to the query. As will be discussed in more detail below with reference to FIG. 4, determining which content providers to query (step 306) may depend, in part, on the television episode the user requested to record.

At step 308, the system 100 determines if any content was returned by the content providers 103 that were queried at step 306. It is possible that none of the content providers will have any content that is relevant to the subject matter of a recorded episode. If the system 100 determines that none of the queried content providers 103 returned any content, the process is completed, at step 309. In this case, a navigation strip will not be provided at step 312 and the system 100 waits for the user to schedule another recording. If, however, the system 100 determines that at least one content provider 103 returned content to the system 100, the technology proceeds to step 310.

Figure 5:
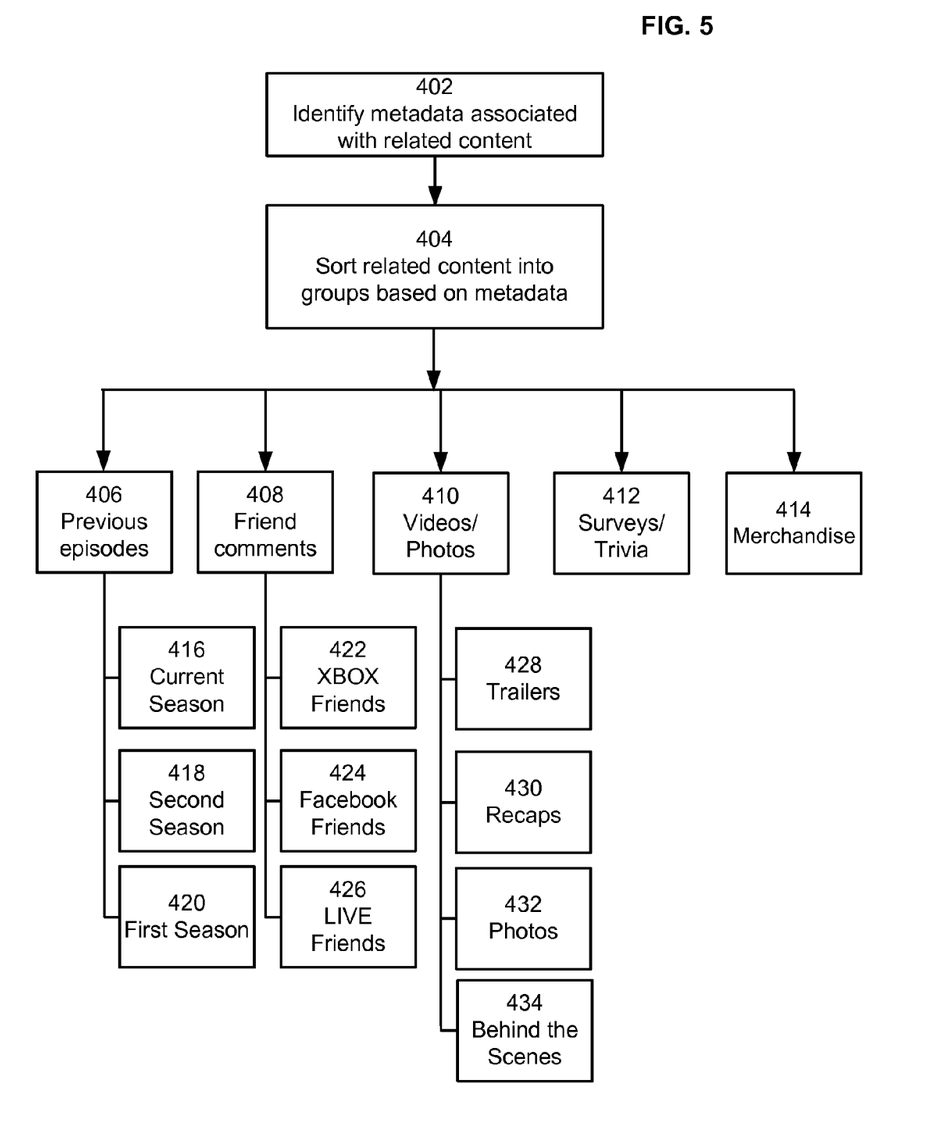
FIG. 5 depicts a flow diagram illustrating exemplary steps of aggregating the content received from content providers.

At step 310, the aggregation engine 144 aggregates like content received from the content providers 103 together. As will be discussed in more detail later, the content groups of like content are the basis for organizing the content provided in a navigation strip. In some embodiments, the groups of like content are predetermined by the system 100, and may be included in the query. FIG. 5 illustrates groups of like content, which include, by way of example only, previous episodes, videos/images, comments by friends, surveys, and merchandise. The groups of like content shown in FIG. 5 are exemplary only, and are not intended to limit the scope of the technology described herein. The content returned by the content providers 103 may be aggregated into different content groups, and content groups may differ based on the subject matter of the television episode the user requested to record (e.g., one set of content groups for sports, one set of content groups for a television series, etc.). The groups of related content are stored in the content database 146.

At step 314, the system 100 renders a navigation strip, which provides access to the relevant content via a single user interface. FIG. 7 illustrates an exemplary navigation strip. The navigation strip provides third-party content available from the content providers 103 that is related to the television episode (or series) that may be of interest to the user. The navigation strip eliminates the need for a user to navigate to numerous third-party sites simply to view the same content that has been aggregated into the navigation strip. In general, a navigation strip is specific to a particular episode and is rendered upon certain actions performed by a user. In some embodiments, a navigation strip is rendered upon the user selecting a recorded episode from a recorded episode menu (e.g., via the set-top box 108 or media player 109). In other embodiments, a navigation strip is rendered when a user selects to pause a viewing of an episode. These user actions are exemplary only, and are not intended to limit the scope of the technology described herein. Other user actions may trigger the rendering of a navigation strip. Additional details of generating a navigation strip are provided later herein with reference to FIG. 6.

Figure 4:
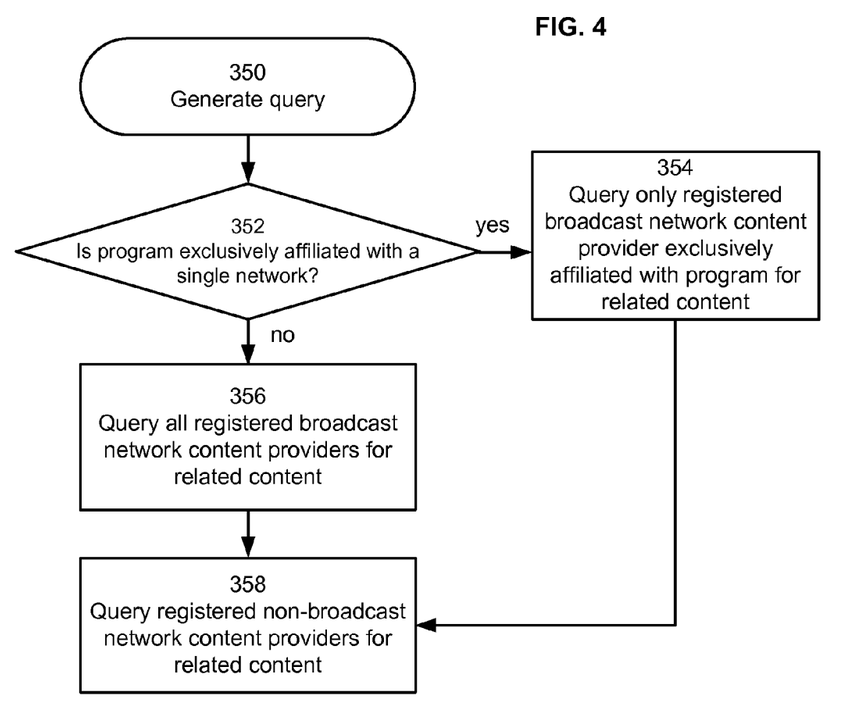
FIG. 4 depicts flow diagrams illustrating exemplary steps of querying content providers.

FIG. 4 provides additional details of querying content providers 103 (step 306 in FIG. 3). At step 350, the query server 142 generates a query. In some embodiments, the query server formats the data in the query packet in Extensible Markup Language ("XML") and creates a query packet including the query for transmission to one or more content providers 103. As is understood to those skilled in the art, XML is a standard format for communicating data. The query packet includes a query for the metadata associated with the episode. In some embodiments, the query packet lists all the metadata associated with an episode. In other embodiments, the query packet only lists the content metadata associated with the television episode.

At step 352, the system 100, in an effort to minimize costs associated with querying content providers 103, determines if all registered content providers 103 should be queried for content relevant to the episode or if only certain content providers could be queried in order to receive the relevant content. In particular, the system 100, at step 352, determines if the episode (or series) scheduled to be recorded is exclusively affiliated with a single broadcast network. Television series are often exclusively affiliated with a single broadcast network. For example, the television series "Lost" is only broadcast on the American Broadcast Channel (ABC) network. None of the other broadcast networks broadcast episodes of "Lost," own a website related to "Lost," etc.

Using an example whereby the user schedules a request to record the "Lost" series, the system 100 determines that the episode is exclusively affiliated with a single network, ABC, at step 352. Thus, the query server 142 sends the query packet over the network 50 to only ABC.com, at step 354. There is likely no need to deliver the query packet to other broadcast network content providers such as NBC, CBS, FOX, etc., because the other broadcast networks are not likely to have any content related to the series "Lost." In this instance, ABC.com processes the query, creates a response packet, and returns the response packet back to the query server 142 via the network 50. Relevant content returned by a broadcast network content provider may include, but is not limited to, prior episodes from the current season, prior episodes from past seasons, one or more network sponsored blogs, message boards, trailers, behind-the-scenes images and videos, and the like. Other content provided by a broadcast television network is within the scope of the technology described herein.

On the other hand, if a user requested to record a one-off broadcast such as a sports event (e.g., baseball game, etc.), a news-related event (e.g., presidential debate, etc.), or a movie, the system 100 determines that the episode is not exclusively affiliated with a single broadcast network at step 352, and proceeds to step 356. The system 100 makes this determination because the subject matter of the episode (sports, news, etc.) is not exclusive to any single network. A sports team is likely broadcast by more than one network during the season, and news and movies are exclusively affiliated with any single network.

At step 358, the query server 142 sends the query packet over the network 50 to the content providers 103 not associated with a broadcast network, i.e., the content hosting websites, social networking sites, third-party blogs, merchandising websites, etc., for content that is related to the episode/series. Such content providers are referred to herein as non-broadcast network content providers. The type of content received from non-broadcast network content providers may vary. For example, a content hosting website may include images, videos, etc.; a social networking site may include comments by friends, images, videos, etc.; a blog may include comments by third-parties, images, videos, etc.; a merchandising website may include offers to sell series-related t-shirts, posters, etc.

Many of the non-broadcast network content providers may require authenticating a user before returning content. In order to query, for example, a social networking site for comments by the user's "friends," the system 100 obtains a user identifier associated with the social networking site from the user information database 148 and authenticates the user before delivering the query. By doing so, a social networking site is able to identify the user's friends and identify comments made by the user's friends that are relevant to the metadata included in the query. The same is true for a content hosting website (e.g., Flickr, etc.) or any other third-party service that requires identifying a user's "friends" or requires user authorization.

FIG. 5 provides additional details of aggregating like content received from the content providers 103 (step 310 in FIG. 3). The system 100, for each instance of relevant content received from a content provider 103, identifies the metadata associated with the content, at step 402. At step 404, the aggregation engine 144 adds a group "tag" to each instance of content received from the content providers 103 based on the metadata identified at step 402.

FIG. 5 illustrates that the relevant content received from the content providers 103 is aggregated into five separate groups of relevant content by adding one of five tags: previous episodes 406, friend comments 408, video/photos 410, surveys/trivia 412, and merchandise 414. The five groups of relevant content 406-414 are exemplary only, and are not intended to limit the scope of the technology described herein. In some embodiments, the number of groups of relevant content, and the type of content within each group, is predetermined by the system 100. In other embodiments, the system 100 creates groups based on identifying the metadata at step 404.

The aggregation engine 144 adds a tag to each instance of relevant content received from a content provider 103. As a result, each instance of relevant content received from a content provider 103 is tagged with a "previous episode" tag 406, a "friend comment" tag 408, a "videos/photos" tag 410, a "surveys/trivia" tag 412 or a "merchandise" tag 414. FIG. 5 illustrates that, in some embodiments, an instance of relevant content may include more than one tag; a group tag and a subgroup tag. As will be discussed in more detail later herein, subgroup tags allow the system 100 to further refine the content provided to a user via a navigation strip. By way of example only, FIG. 5 illustrates that the previous episodes group 406 includes three subgroups: current season 416, second season 418 and first season 420; the friend comments group 408 includes three subgroups: XBOX friends 422, Facebook friends 424, and LIVE friends 426; and the videos/photos group 410 includes four subgroups: trailers 428, recaps 430, photos 432 and behind-the-scenes 434. These subgroups are exemplary only, and are not intended to limit the scope of the technology described herein. Each content group 406-414 may include different subgroups or any number of subgroups. It is also within the scope of the technology described herein for one or more content groups to not have any subgroups (e.g., groups 412-414).

Figure 6:
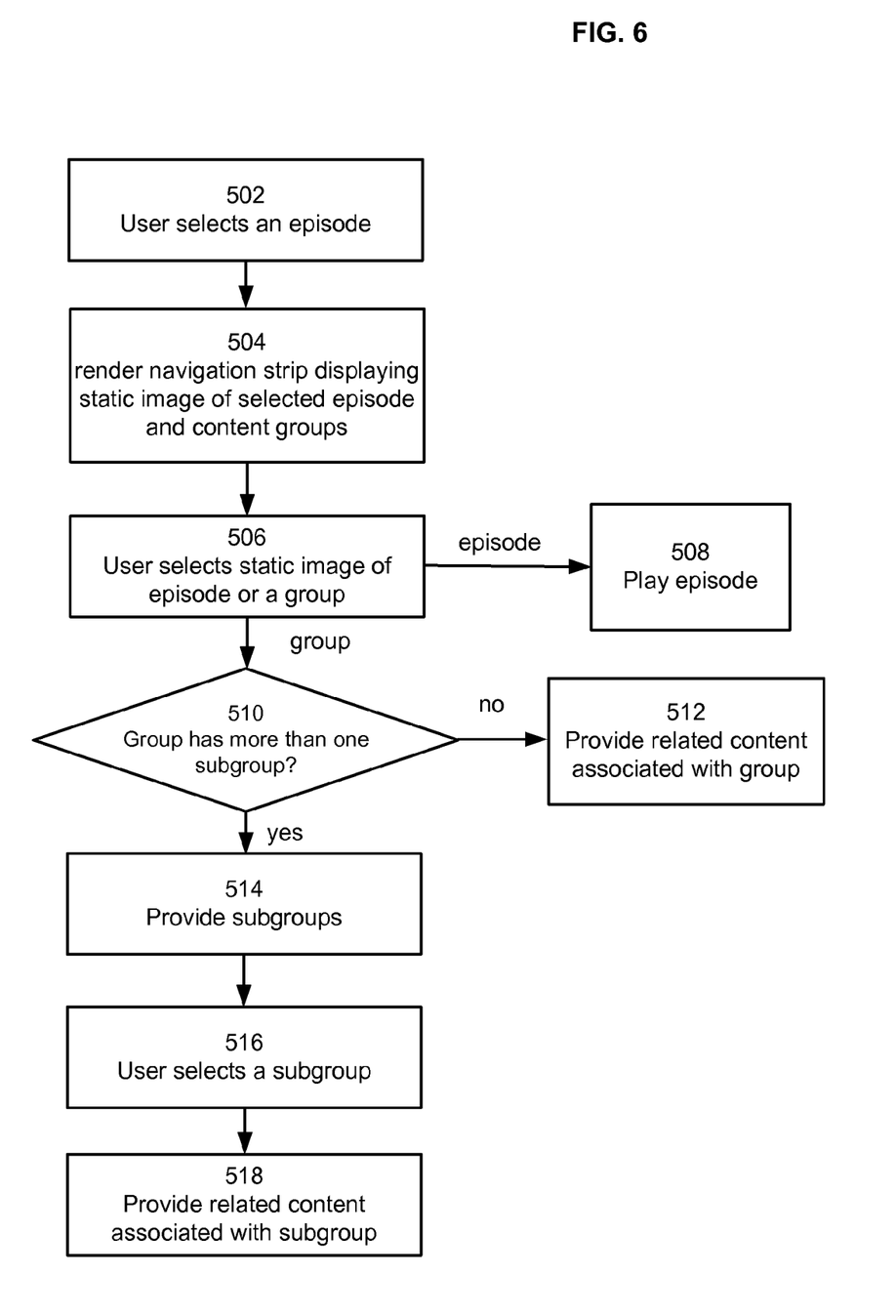
FIG. 6 depicts a flow diagram illustrating exemplary steps of generating a navigation strip.
Figure 7:
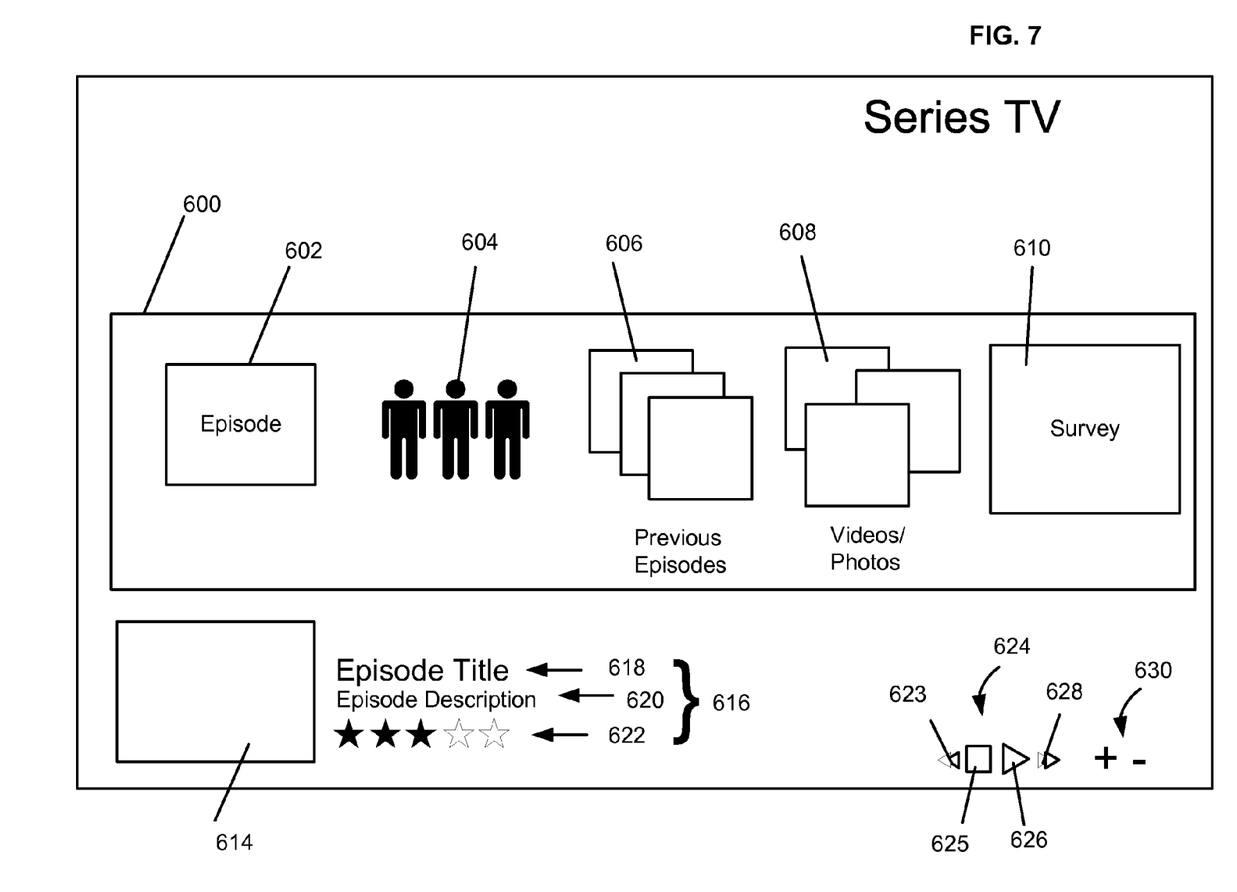
FIG. 7 depicts an exemplary navigation strip.

FIG. 6 provides additional detail of rendering a navigation strip (step 312 in FIG. 3). A navigation strip provides a framework for displaying third-party content related to an episode in a single user interface. A navigation strip is rendered in response to an action performed by a user indicating that the user may be interested in viewing third-party content related to the episode.

At step 502, a user performs an action that triggers the rendering of the navigation strip. In some embodiments, a user navigates to a recorded episodes menu (not shown), which displays the television episodes that have been recorded and selects an episode. Such menus are known today and are commonly provided via either the media player 109 or set-top box 108. In other embodiments, a user selects to pause a recorded episode while viewing the episode via media controls provided by the media player 109 or set-top box 108 (e.g., a remote control, click of a mouse button, etc.). For the purposes of describing the technology only, the user selects an episode in a recorded episodes menu, at step 502.

At step 504, the system 100 renders a navigation strip based on the episode selected by the user. FIG. 7 illustrates an exemplary navigation strip 600, which provides the third-party content (received from the content providers 103) related to a specific episode in a simple, easy to consume user interface. The navigation strip 600 includes a static image 602 of the episode selected by the user and a graphical icon representing each group of relevant content. Using the groups provided in FIG. 5, the navigation strip includes a friends icon 604, a previous episodes icon 606, a videos/photos icon 608, a survey icon 610, and a merchandise icon 612 (not viewable in FIG. 7). The user may scroll to the right in the navigation strip 600 to view the group not initially viewable. The group icons 604-612 provide a user an instant preview of the third-party content that is related to a certain episode and is available for viewing.

The user may view the recorded episode by selecting the static image 602 in the navigation strip 600. Upon selecting the image 602, the media player 109 or set-top box 108 plays the episode via the computer 102 or television 100 for viewing by the user.

The friends icon 604, when selected by a user, provides access to comments by the user's friends related to the episode (or series). The previous episodes icon 606, when selected by a user, provides access to previous episodes of the program that were received from the content providers 103. The video/photos icon 608, when selected by a user, provides access to videos and photos related to the episode (or series) that were received from the content providers 103. The survey icon 610, when selected by a user, provides access to surveys and trivia related to the episode (or series) that were received from the content providers 103. The merchandise icon 612, when selected by a user, provides access to merchandise opportunities related to the episode (or series) that was received from the content providers 103.

FIG. 7 illustrates that the navigation strip 600 is accompanied by a summary 616, which provides a summary of the current selection in the navigation strip 600. In one embodiment, the default current selection when a navigation strip is rendered is the episode image 602. In this instance, the summary 616 includes an image 614 of the episode, the episode title 618, episode description 620 and rating 622. The image 614 is preferably larger than the image 602 provided in the navigation strip 600 for easier viewing. Similar to the image 602, the image 614 may be a static image, video, trailer, etc. related to the episode.

Returning to FIG. 6, the user selects either the image 602 or one of the group icons 604-612, at step 506. If the user selected the image 602 at step 506, the set-top box 108 or media player 109 plays the episode, at step 508. If, however, the user selected a group icon at step 506, the technology determines if the group (e.g., prior episodes, photos/videos, etc.) selected at step 506 includes more than one subgroup, at step 510. If the group does not include more than one subgroup, the relevant content within the selected group is presented to the user, at step 512. If the group selected by the user includes more than one subgroup, the technology provides the subgroup icons in the navigation strip 600. By way of example only, and using the content groups shown in FIG. 5, if the user selects the videos/photos group icon 608, the technology may present a trailer icon, a recaps icon, a photos icon and a behind-the-scenes icon in the navigation strip if related content from each subgroup was received from a content provider 103 (steps 308, 310 in FIG. 3). Upon the user selecting a subgroup icon, at step 516, the technology displays the relevant content received from the content providers 103 in the navigation strip 600. If there are no subgroups (or only a single subgroup) within the selected content group, the technology provides the relevant content received from the content providers 103 that have been tagged with the group label (e.g., video/photos group 410).

Displaying subgroup icons (steps 510-518 in FIG. 6) in the navigation strip 600 is optional. In some embodiments, all the relevant content within a group is displayed upon selection of the group icon. FIGS. 7-11 also illustrates media controls 624, which include a rewind button 623, a stop button 625, a play button 626, a fast-forward button 628 and volume controls 630.

Figure 8:
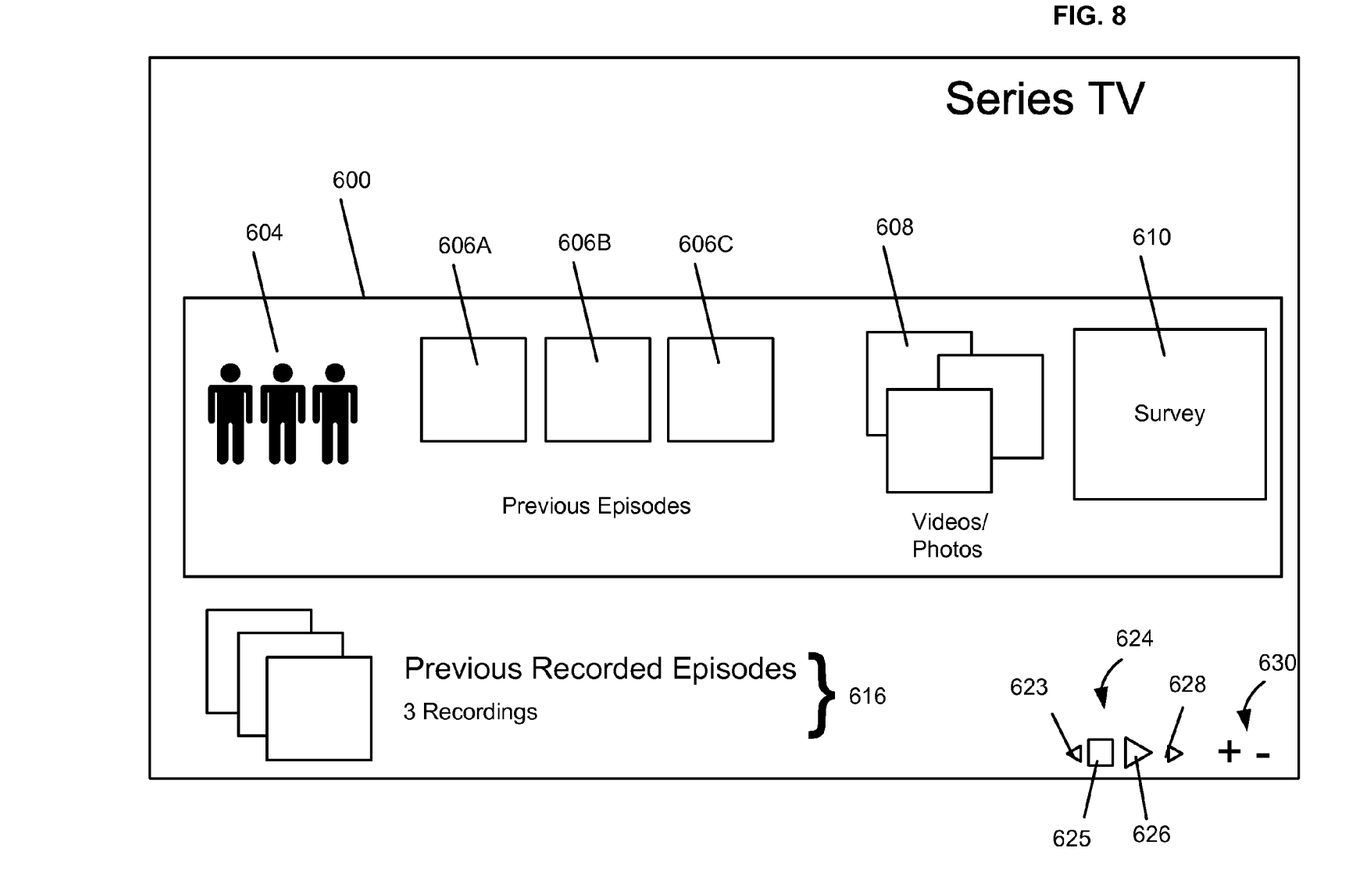
FIG. 8 depicts the navigation strip shown in FIG. 7 upon a user selecting to view prior episodes.

FIGS. 8-11 provide additional detail of displaying relevant content within a navigation strip 600. FIG. 8 illustrates that a user has selected the previous episodes icon 606 in the navigation strip 600. By doing so, the previous episodes icon 606 has expanded into three icons 606A, 606B, and 606C. In one embodiment, the three icons 606A-606C each represent a prior episode of the television series associated with the episode selected by the user. FIG. 8 illustrates that only three prior episodes of the television series were received from a content provider 103 (step 308 in FIG. 3). In other embodiments, the three icons 606A-606C each represent a subgroup of the prior episodes content group 406 (see FIG. 5). Using the examples provided in FIG. 5, icon 606A may represent a current season subgroup icon, icon 606B may represent a second season subgroup icon, and icon 606C may represent a first season subgroup icon. Upon selecting one of the three subgroup icons, the prior episodes associated with the particular season are presented to the user in the navigation strip 600 (e.g., prior episodes from the current season 416 are displayed upon selection of icon 606A).

The summary 616 provides additional details about the prior episodes available to the user via the navigation strip 600. In particular, the summary 616 indicates that three prior episodes are available for viewing. Thus, using the FIG. 8 example, the icons 606A-606C displayed in the navigation strip 600 each represent a prior episode. The prior episodes available for viewing may have been received from a single content provider or received from multiple content providers. The user simply recognizes that three prior episodes of the television series are available for viewing via the navigation strip 600.

Figure 9:
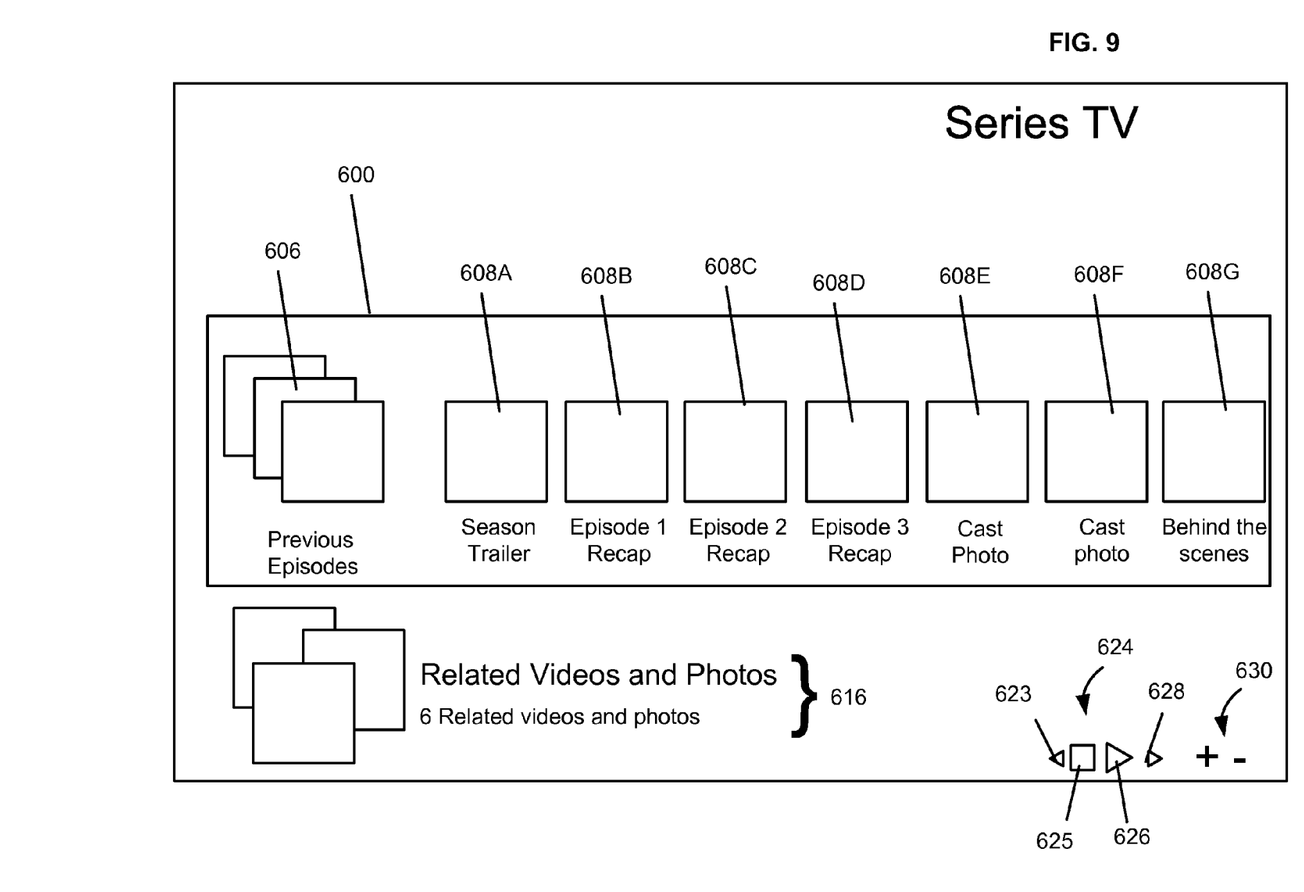
FIG. 9 depicts the navigation strip shown in FIG. 7 upon a user selecting to view photos/videos.

FIG. 9 provides an example of the navigation strip 600 upon a user selecting the videos/photos icon 608 (see FIG. 7). In the FIG. 9 example, the video/photos icon 608 has expanded into seven instances of content available for viewing. The episode 602, friends icon 602, and survey icon 610 are no longer viewable in the navigation strip 600. The user may scroll within the navigation strip 600 to return to any one of these icons. FIG. 9 illustrates that subgroup icons are not required. The relevant content within the videos/photos group 410 is displayed in the navigation strip 600. The relevant videos/photos content displayed in the navigation strip 600 includes a season trailer 608A, an episode 1 recap 608B, an episode 2 recap 608C, an episode 3 recap 608D, a first cast photo 608E, a second cast photo 608F, and a behind-the-scenes video 608G. These videos/photos are exemplary only, and are not intended to limit the scope of the technology described herein.

The relevant content in the videos/photos group may be displayed in the navigation strip 600 in any manner such as, but not limited to, date, ratings, favorites, and the like. Using the subgroups 428-434 of the videos/photos group 410 shown in FIG. 5, the relevant content is displayed in the navigation strip by subgroup. The relevant content within a subgroup may also be displayed in the navigations trip 600 in any manner. Each subgroup icon 608A-608G may be a static image, a streaming video, and the like. Upon selection of a subgroup icon, the image, video, etc. is displayed to the user.

The summary 616 displayed below the navigation strip 600 indicates that six related videos and photos are available for viewing. In this instance, the technology previously received six videos/photos (step 308 in FIG. 3) in response to querying the content providers 103 (Step 306 in FIG. 3), aggregated the six videos/photos into the videos/photos group 410 (see FIG. 5), and stored the content in the content database 146. The technology then delivers the six videos/photos to the navigation strip 600. The user is unaware of the source of each video/photo.

Figure 10:
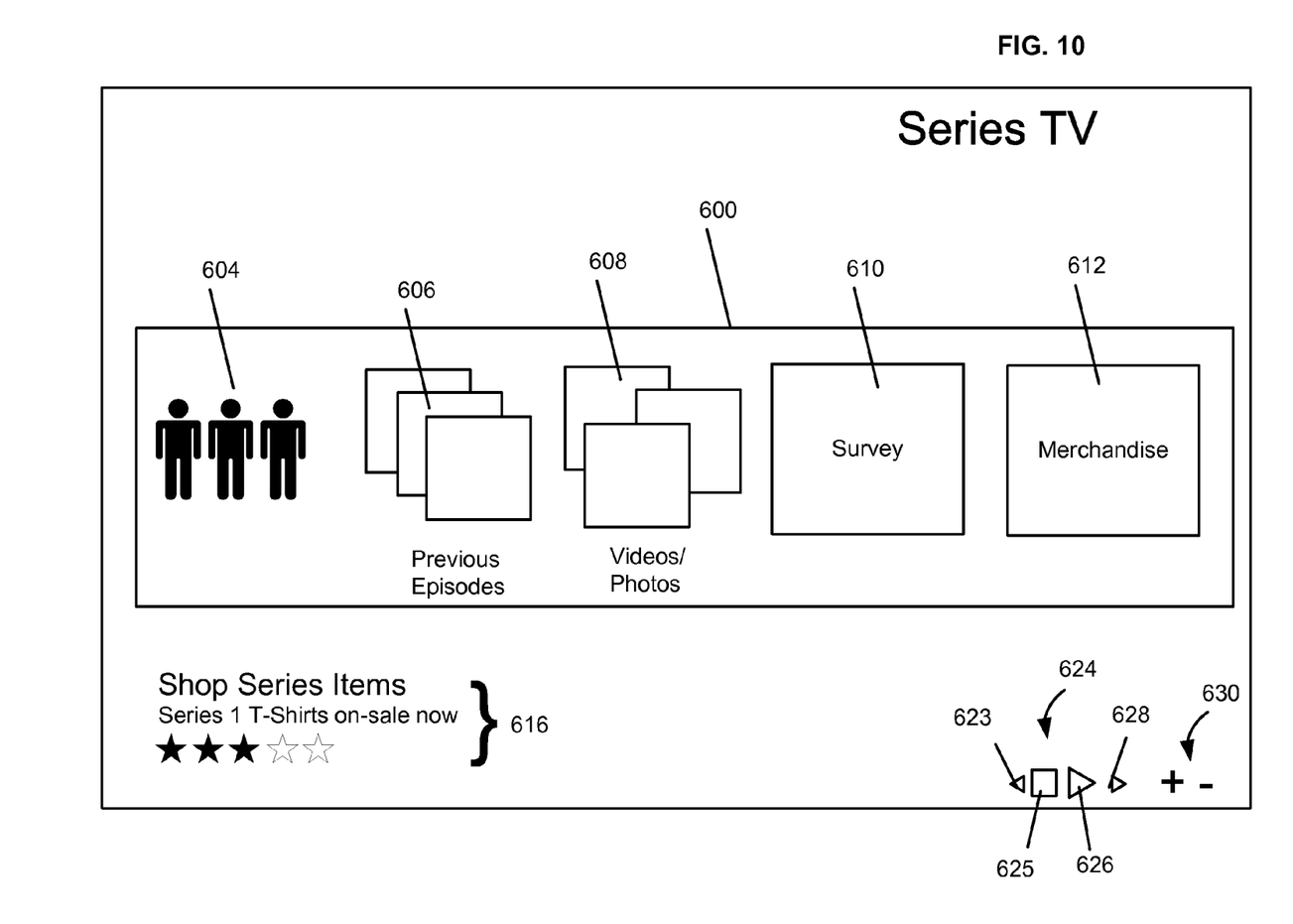
FIG. 10 depicts the navigation strip shown in FIG. 7 upon a user selecting to view merchandise.

FIG. 10 illustrates that a user has selected the merchandise icon 612 in the navigation strip 600. By doing so, merchandising offers that were received from one or more content providers 103 (step 308 in FIG. 3) are provided to the user via the navigation strip 600. Merchandising offers may refer to any offer to sell products (e.g., apparel, DVDs, etc.), services (e.g., spend a day with the cast, etc.), etc. that is related to the television episode displayed in the navigation strip 600 (or series). The summary 616 indicates that Series 1 (first season) t-shirts are on sale, and other buyers of the t-shirt have rated the t-shirt 3 out of 5 stars. The t-shirts are being offered by a content provider 103, which returned the t-shirt offer to the system 100 in response to a query (step 308 in FIG. 3). The user is not aware of which content provider is selling the t-shirt. Upon selecting the merchandise icon 612 in the navigation bar 600, the merchandise offer is presented in a separate user interface (not shown).

Figure 11:
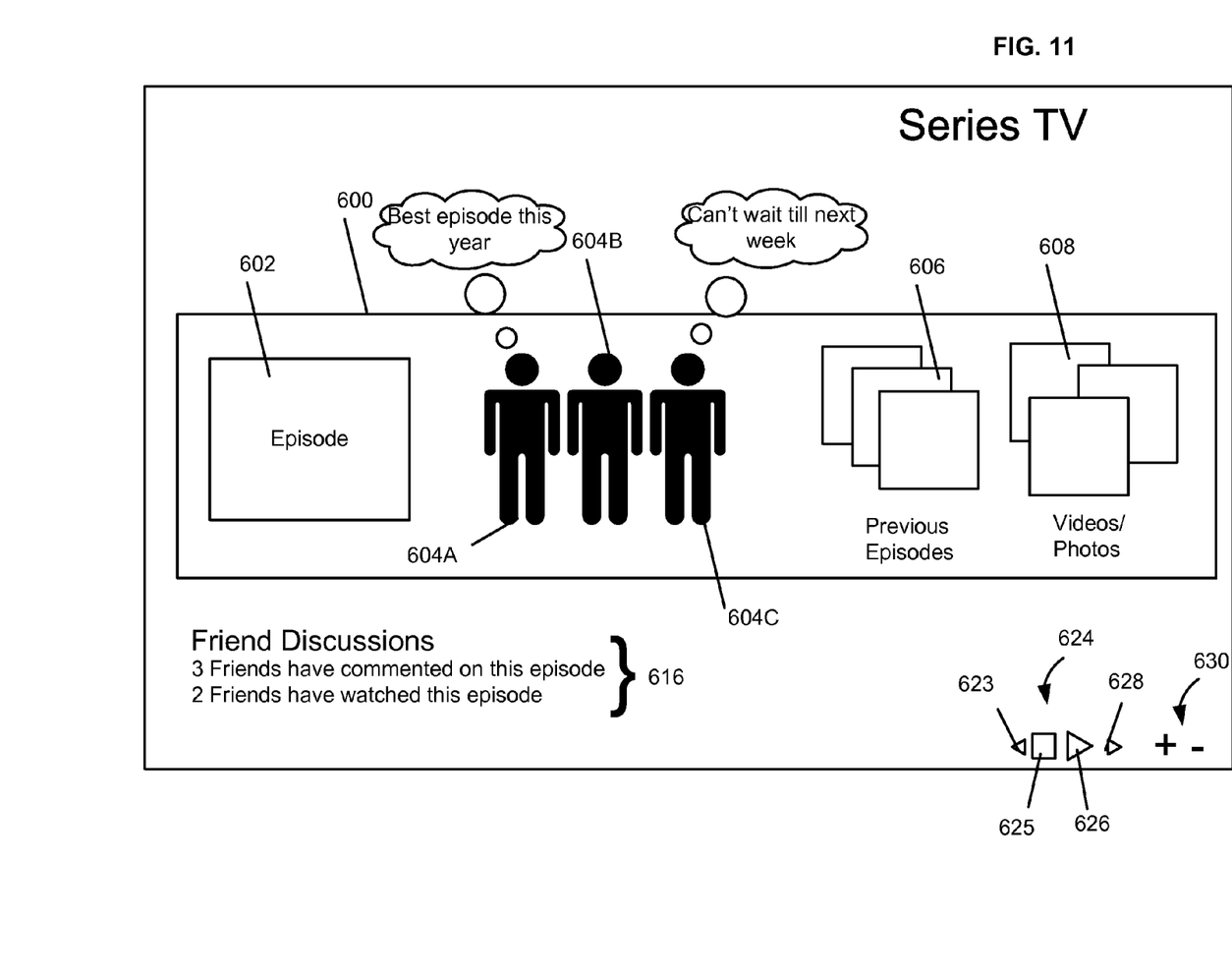
FIG. 11 depicts the navigation strip shown in FIG. 7 upon a user selecting to view friend comments.

FIG. 11 illustrates an example whereby a user has selected the friends icon 604 in the navigation strip 600. The system 100 has previously queried the third-party services that may include comments posted by the user's friends, received comments from the content providers (step 308 in FIG. 3), and aggregated the comments into a friends group 408 (and possible subgroups). Upon selecting the icon 604, the system 100 delivers the comments to the navigation strip 600. Thus, the friends icon 604 allows a user to view comments made by various friends that are related to the episode/series in a single user interface.

FIG. 11 illustrates that, upon selecting the friends icon 604, three friend characters 604A, 604B and 604C are displayed in the navigation strip 600. Comments by the friend 602A ("Best episode this year") and the friend 602C ("Can't wait till next week") about the episode have "bubbled up." It is within the scope of the technology described herein to display a different number of friend characters in the navigation strip 600. In some embodiments, the friend's comments are related specifically to the episode shown in the navigation strip 600 (image 602). In other embodiments, the friend's comments may also be related to any other episodes and/or the series. If more comments were received from the content providers 103 than can be displayed simultaneously in the navigation strip 600, the technology may display friend subgroups (e.g., XBOX friends, LIVE friends, etc.) in the navigation strip 600 similar to displaying the prior episodes in FIG. 8. The friend characters may be rotated in and out of the navigation strip 600 to first display friends with most recent comments first, favorite friends first, and the like. The summary 616 indicates that three friends have commented on the episode associated with the image 602, and two friends have watched the episode.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed is:

1. A method for displaying media content, comprising:
    detecting that a device has been programmed by a user to record a television program; querying a plurality of content providers for content related to the television program, the querying includes specifying a date range for the content related to the television program, the date range is determined based on whether the television program is in-season or off-season;

receiving content related to the television program from the plurality of content providers in response to querying the plurality of content providers;

aggregating the content related to the television program received from the plurality of content providers into content groups;

storing the content related to the television program received from the plurality of content providers in a database; and upon detecting an action performed by the user, rendering a navigation strip that allows a user to view the content related to the television program received from the plurality of content providers by content group; the plurality of content providers includes a social networking site, the content related to the television program includes comments made by friends of the user on the social networking site; and the television program comprises an off-season television program, wherein the date range comprises a longer date range than an in-season date range corresponding with an in-season television program.

2. The method as recited in claim 1, wherein the querying a plurality of content providers for content related to the television program comprises:

identifying content metadata associated with a next television episode of the television program to broadcast;

identifying registered content providers to query;

creating a query packet containing a request for content that is related to the content metadata associated with the next television episode; and delivering the query packet to each of the registered content providers.

3. The method as recited in claim 2, wherein the step of identifying registered content providers to query comprises the steps of:

selecting at least one registered broadcast network content provider to deliver the query packet; and selecting at least one registered non-broadcast network content provider to deliver the query packet.

4. The method as recited in claim 1, wherein the step of aggregating the content received from the plurality of content providers comprises the steps of:

identifying metadata associated with each instance of content received from a registered content provider;

creating a plurality of content groups based on a subset of the identified metadata; and associating each instance of content with one of the plurality of content groups.

5. The method as recited in claim 4, wherein the step of rendering a navigation strip comprises the step of:

detecting that the user has selected to view a television episode that has been recorded by the device; and rendering a navigation strip displaying the selected television episode and the content received from the plurality of content providers organized by content group.

6. The method as recited in claim 4, wherein the step of rendering a navigation strip comprises the step of:

detecting that the user has selected to pause a viewing of a television episode recorded by the device; and rendering a navigation strip displaying the television episode being viewed by the user and the content received from the plurality of content providers organized by content group.

7. The method as recited in claim 2, wherein the step of identifying registered content providers to query comprises the steps of:

determining that the television program to be recorded by the device is exclusively affiliated with a broadcast network;

selecting to query only the registered broadcast network content provider that is exclusively affiliated with the television program; and selecting to query at least one registered non-broadcast network content provider.

8. The method as recited in claim 1, further comprising:

upon detecting a recording of a subsequent episode of the television series, obtaining metadata associated with the subsequent episode;

querying a plurality of registered content providers for content related to the subsequent episode;

receiving content related to the subsequent episode from the plurality of registered content providers;

aggregating the content received from the plurality of registered content providers by content groups; and storing the content received from the plurality of registered content providers in a database.

9. The method as recited in claim 2, wherein the content received from the plurality of content providers displayed in the navigation strip is related to the television series.

10. A method for displaying media content, comprising:

detecting that a user has scheduled a recording of a television episode via an electronic program guide;

obtaining metadata associated with the television episode from an electronic program guide service, the metadata includes a content title of the television episode; querying at least one non-broadcast network content provider for content that is relevant to the metadata associated with the television episode, the querying at least one non-broadcast network content provider includes specifying a date range for relevant the content that is relevant to the metadata, the date range is determined based on whether the television episode is in-season or off-season; the at least one non-broadcast network provider includes a social networking site, the content that is relevant to the metadata includes comments made by friends of the user on the social networking site;

receiving content from the at least one non-broadcast network content provider in response to the querying at least one non-broadcast network content provider;

aggregating the content received from the at least one non-broadcast network content provider into content groups; and rendering a navigation strip upon detecting an action performed by the user, the navigation strip providing access to a recording of the television episode and the comments made by the friends of the user on the social networking site within the date range; wherein the television episode comprises an off-season television episode and the date range comprises a longer date range than an in-season date range corresponding with an in-season television episode.

11. The method as recited in claim 10, wherein the step of obtaining metadata associated with the television episode comprises the step of:

obtaining content metadata associated with the television episode.

12. The method as recited in claim 10, wherein the television episode comprises an in-season television episode, the querying at least one non-broadcast network content provider for content that is relevant to the metadata comprises querying the social networking site for content that has been added to the social networking site since a last episode of a television series associated with the television episode.

13. The method as recited in claim 10, wherein the step of querying at least one non-broadcast network content provider comprises the steps of:
- creating a query packet containing the metadata associated with the television episode and user profile information associated with the non-broadcast network content provider, the user profile information obtained from a user information database; and
- delivering the query packet to the non-broadcast network content provider.

14. A method for displaying media content to a user, comprising: obtaining metadata associated with a television episode that has been recorded by a device; creating a query packet containing a request for content related to the metadata associated with the television episode, the request for content specifies a date range for relevant content that is determined based on whether the television episode is an in-season episode or an off-season episode; delivering the query packet to a plurality of content providers, the plurality of content providers includes a social networking site, the content related to the metadata includes comments made by friends of the user on the social networking site;
- receiving content from the plurality of content providers in response to delivering the query packet to the plurality of content providers;
- aggregating the content received from the plurality of content providers into content groups; storing the content received from the plurality of content providers in a database; and upon detecting that the user has selected to view a recording of the television episode, rendering a navigation strip that provides access to the comments made by the friends of the user on the social networking site within the date range; wherein the television episode is associated with a television series, the rendering the navigation strip comprises providing access to the content received from the plurality of content providers that is related to the television series associated with the television episode selected by the user, wherein the television episode comprises an off-season television episode and the date range comprising a longer date range than an in-season date range corresponding with an in-season television episode of the television series.

15. The method as recited in claim 14, wherein the step of delivering the query packet to a plurality of content providers comprises the steps of:
- selecting at least one non-broadcast network content provider; and
- delivering the query packet to the at least one non-broadcast network content provider.

16. The method as recited in claim 14, wherein the step of aggregating like content received from the plurality of content providers into content groups comprises the steps of:
- identifying metadata associated with each instance of content received from the plurality of content providers;
- creating content groups based on the metadata associated with each instance of content received from the plurality of content providers; and
- associated each instance of content received from the plurality of content providers with a content group.

* * * * *